United States Patent [19]

Sakakibara et al.

[11] 4,215,760

[45] Aug. 5, 1980

[54] AUTOMOBILE SPEED CONTROL SYSTEM

[75] Inventors: Naoji Sakakibara, Chiryu; Shoji Kawata, Okazaki, both of Japan

[73] Assignee: Aisin Seiki Kabushiki Kaisha, Kariya, Japan

[21] Appl. No.: 888,801

[22] Filed: Mar. 21, 1978

[30] Foreign Application Priority Data

Mar. 22, 1977 [JP] Japan ................................. 52-31294
Mar. 24, 1977 [JP] Japan ................................. 52-32499

[51] Int. Cl.² ............................................ B60K 31/00
[52] U.S. Cl. ..................................... 180/176; 123/352
[58] Field of Search ............. 180/105 E, 108, 105 R, 180/110, 176, 177, 170; 123/102, 103 R

[56] References Cited

U.S. PATENT DOCUMENTS

| Re. 27,324 | 3/1972 | Granger et al. | 180/176 |
|---|---|---|---|
| 3,381,771 | 5/1968 | Granger et al. | 180/176 |
| 3,477,346 | 11/1969 | Slavin et al. | 91/361 |
| 3,485,316 | 12/1969 | Slavin et al. | 180/176 |
| 3,599,154 | 8/1971 | Carol, Jr. et al. | 180/176 X |
| 3,793,622 | 2/1974 | Hida et al. | 180/176 X |
| 3,885,644 | 5/1975 | Seidler et al. | 123/102 X |
| 3,952,829 | 4/1976 | Gray | 180/170 |
| 4,056,157 | 11/1977 | Kawata | 180/176 |

*Primary Examiner*—John J. Love
*Assistant Examiner*—Milton L. Smith
*Attorney, Agent, or Firm*—Sughrue, Rothwell, Mion, Zinn and Macpeak

[57] ABSTRACT

Automobile speed control system to maintain actual automobile speed at a desired automobile speed, in which a first electrical signal indicating actual automobile speed is compared with a second electrical signal indicating desired automobile speed in a comparator circuit to obtain an error signal indicating the difference between actual and desired automobile speeds. The error signal is supplied to throttle valve control means to shift a throttle valve into a position at which actual automobile speed equals the desired automobile speed. A superposed signal, consisting of the first electric signal and a negative feedback signal substantially indicating throttle valve position, is applied to a memory capacitor which provides the second electrical signal. Rememorization of the capacitor is controlled by a set switch through a memorization control circuit. The desired automobile speed level to be memorized on the capacitor is controlled by closure duration and closure repetition of the set switch.

4 Claims, 2 Drawing Figures

AUTOMOBILE SPEED CONTROL SYSTEM

BACKGROUND OF THE INVENTION

The present invention relates to improvement in speed control systems for automobiles. More particularly, the invention relates to a speed control system which maintains the speed of automobiles at a stabilized desired value by employing a negative feedback loop.

Speed controls for automobiles are now in commercial use, in which the actual speed of an automobile is compared with a preselected desired value to generate an error signal for controlling a throttle valve to a position at which the actual speed corresponds to a preselected value. Generally speaking, automatic speed control of automobiles requires stabilization of the speed control system. If the stabilization should not be sufficient, so-called hunting, overshoot or undershoot of the actual speed of the automobile, occurs. The hunting can be prevented by deteriorating the responsibility and accuracy of the speed control system. However, the hunting can also be prevented without deteriorating this responsibility by employing negative feedback control of the throttle valve as shown in U.S. Pat. No. 3,381,771 (issued May 7, 1968). In the invention of the patent, an actual speed indication signal from a tachometer generator of an automobile speedometer and a preselected desired speed indication signal from a speed set potentiometer are supplied to a comparator circuit to generate an error signal to control the throttle valve position, then the error signal is supplied to a differential amplifier circuit together with a throttle position feedback signal (the negative feedback signal) from a feedback potentiometer linked with the throttle valve. An output signal from the differential amplifier circuit is supplied to a vacuum modulator which in response thereto provides to a vacuum motor vacuum pressure related to the output signal. The vacuum motor is mechanically ganged to the throttle valve and controls its position. Thus the output differential signal of the differential amplifier regulates the position of the throttle valve. The negative feedback of the throttle valve position prevents extra movement of the throttle valve toward opening or closing. Therefore, over-acceleration and -deceleration of the automobile are prevented. The desired speed set on the speed set potentiometer is altered by rotating a lever connected to the slider of the potentiometer. Similar speed controls for automobiles are disclosed in U.S. Pat. Nos. RE. 27,324 (issued Mar. 28, 1972), 3,477,346 (issued Nov. 11, 1969), 3,485,316 (issued Dec. 23, 1969), 4,056,157 (issued Nov. 1, 1977). A negative feedback circuit without use of a feedback potentiometer, and which compares a speed error signal with an actual automobile speed signal to generate a negative feedback signal, is disclosed in U.S. Pat. No. 3,952,829 (issued Apr. 27, 1976). Also a negative feedback circuit without use of a feedback potentiometer, and which has a circuit means for retarding the speed error signal to be supplied to a desired speed signal generator circuit as the negative feedback signal, is disclosed in U.S. Pat. No. 3,793,622 (issued Feb. 19, 1974). In the prior art, the systems for maintaining automobile speed constant have a speed memorization capacitor to which the first electric signal, indicating actual speed, is applied, and a set switch to close the charging loop of the capacitor for memorization of actual speed as seen in U.S. Pat. No. 3,485,316; and the memorized voltage level of the capacitor is supplied to the comparator as a desired speed indication signal. The desired speed set on the capacitor is altered by accelerating or decelerating the automobile and momentarily closing the set switch at the desired accelerated or decelerated speed. To accelerate speed automatically to alter the desired speed set on the capacitor, one or more switches, as well as one or more additional drive circuits to operate the throttle valve actuator toward opening of the throttle valve, are required. Thus, a plurality of set switches and drive circuits are required automatically to alter the desired speed set on the capacitor by switch operation.

SUMMARY OF THE INVENTION

One object of the present invention is to provide an automobile speed control system which is readily adjustable by means of a set switch automatically to set a desired automobile speed into the system. Another object of the present invention is to provide an automobile speed control system in which the set desired automobile speed is altered automatically by the switching duration of a set switch. These and other objects and advantages of the present invention will become readily apparent from the following detailed description.

According to the present invention a superposed signal, consisting of a first electric signal indicating actual automobile speed and a negative feedback signal indicating substantially throttle valve position, is applied to the memory member of a memory circuit which provides a comparator a desired automobile speed signal. The memory member is energized to memorize the superposed signal by a memorization control circuit which in turn is controlled by the switching operation of a set switch to form a memorizing loop with the memory member. In a preferred embodiment of the invention the memory member is a capacitor and the memorization control circuit is an electronic switching circuit which normally opens the charging loop of the capacitor and closes the charging loop in correspondence with the operation of the set switch.

DESCRIPTION OF THE PREFERRED EMBODIMENT

Figure 1:
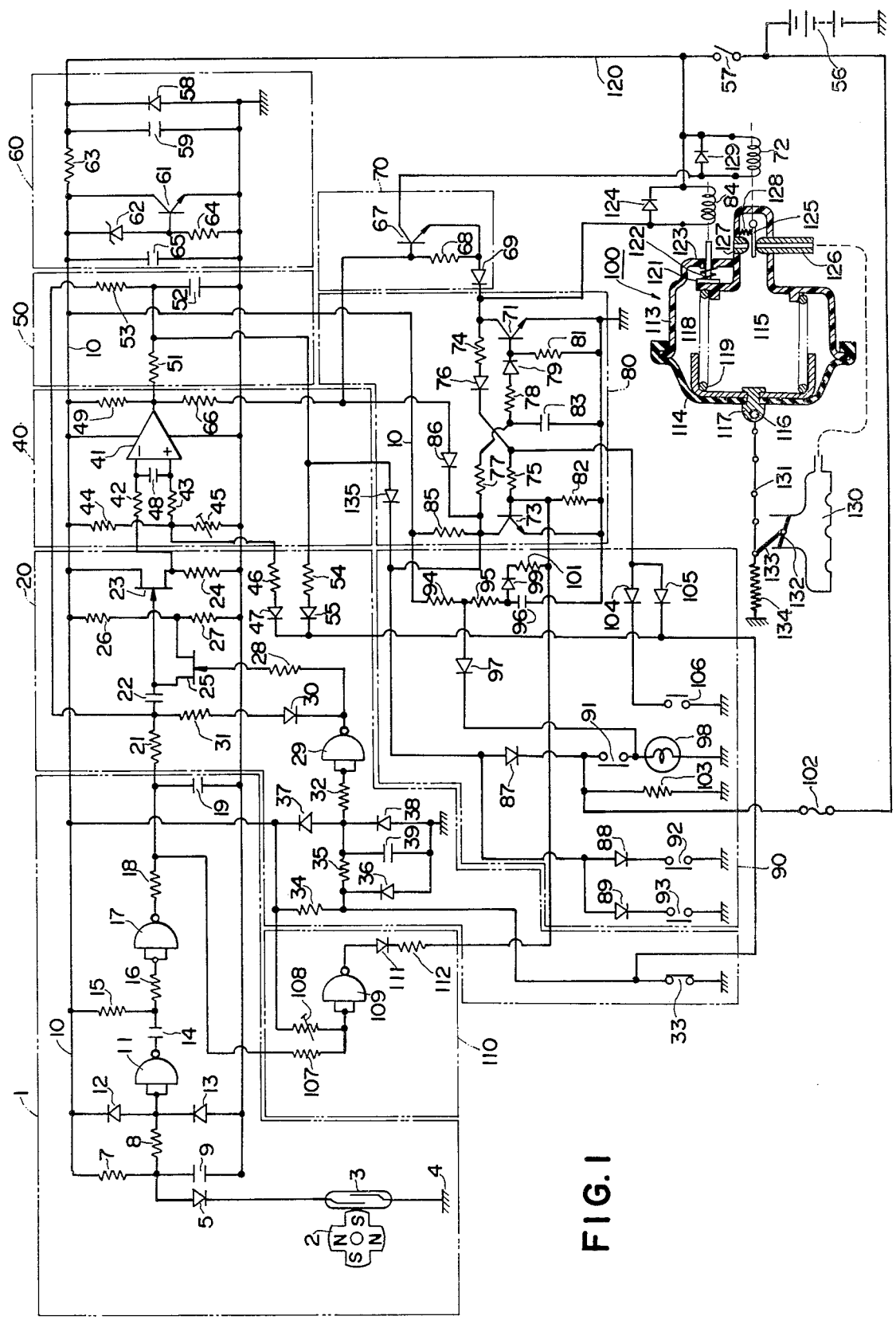
FIG. 1 is a schematic circuit diagram illustrating a preferred embodiment of the present invention.

Referring to FIG. 1, there is shown a preferred embodiment of the present invention, which comprises an actual speed signal generator circuit 1, a memory and comparator circuit 20, a comparator circuit 40, a feedback circuit 50, a voltage control circuit 60, a power amplifier circuit 70, a self-maintaining circuit 80, a speed set control circuit 90, a vacuum actuator 100 and a speed set control prohibition circuit 110.

The actual speed signal generator circuit 1 includes a magnet 2 which is driven to rotate at the same speed as the speedometer cable of an automobile. In synchronism with the rotation of the magnet 2, a reed switch 3 opens and closes by turns repeatedly. One terminal of reed switch 3 is connected with ground 4, and its other terminal is connected to a connection point between a resistor 7 and a capacitor 9 through a diode 5. The resistor 7 and capacitor 9 are connected with a constant voltage line 10 and ground respectively. One terminal of a resistor 8 is connected with the connection point between resistor 7 and capacitor 9, and its other terminal is connected with a connection point to which the input terminal of a COS/MOS (Complementary symmetry metal-oxide semiconductor, e.g., CD4011A of RCA Corporation) -NAND gate 11, the anode of a diode 12 and the cathode of a diode 13 are connected. The diodes 12 and 13 are connected with constant voltage line 10 and ground, respectively. The output of NAND gate 11 is supplied to the input terminal of a NAND gate 17 through a capacitor 14 and a resistor 16. One terminal of a resistor 15 is connected with a connection point between capacitor 14 and resistor 16, and its other terminal is connected with constant voltage line 10. The capacitor 14 as well as resistor 15 determine a metastable state interval of a mono-multivibrator formed by the resistor 16 and NAND gate 17. A resistor 18 and a capacitor 19 are connected with the output terminal of NAND gate 17 and form an integration circuit. The magnet 2 rotates with a speed which is proportional to the actual speed of the automobile. Thus, the ON, OFF repetition frequency of reed switch 3 is proportional to actual speed, and the voltage level at the connection point between capacitor 9 and resistor 7 pulsates between the constant voltage level of line 10 and ground level. The capacitor 9 absorbs high frequency pulsations caused by the chattering of the reed segments in switch 3. The diodes 12 and 13 prevent application of surges to NAND gate 11. The capacitor 14 and resistor 15 form a timer circuit, which provides a constant delay time to raise the input voltage level up to the threshold level of NAND gate 17 after it has fallen to ground at the output of NAND gate 11. Therefore, the output of NAND gate 17 pulsates by one cycle in one ON, OFF cycle of reed switch 3. Namely, NAND gate 17 operates as a mono-multivibrator and generates a series of pulses, the positive pulse width of which corresponds to the constant delay time of the timer circuit, and the repetition rate of which is proportional to the actual speed of the automobile. The capacitor 19 is charged by the pulses. Therefore, the voltage level on capacitor 19 indicates actual speed of the automobile.

The memory and comparator circuit 20 memorizes the second electrical signal which indicates the desired speed of the automobile and combines the first and second signals, as well as the negative feedback signal, to compare the first electrical signal with the second electrical signal. The circuit 20 includes an input resistor 21, a memory capacitor 22, and a FET (Field Effect Transistor) 23. The drain of FET 23 is connected with constant voltage line 10 and its source is connected to ground through a resistor 24. The FET 23 is employed as an impedance converter. A FET 25 for analog switching is connected between the gate of FET 23 and the connection point of resistors 26 and 27. The gate of FET 25 is connected to the output terminal of a NAND gate 29 through a resistor 28. The output terminal of NAND gate 29 is also connected to the input terminal of memory capacitor 22 through a diode 30 and a resistor 31. The NAND gate 29 receives via resistors 32 and 35 the voltage level of line 10 through a resistor 34 or ground level through a desired speed set switch 33 fully described hereinafter. A diode 36 and a capacitor 39 are respectively connected between ground and the input and output terminals of resistor 35. The resistor 35, capacitor 39 and diodes 36, 37 and 38 are connected to the input stage of NAND gate 29 to absorb noise toward NAND gate 29.

In the open state of the desired speed set switch 33, the input of NAND gate 29 is at a high level "H", so that output of NAND gate 29 is at a low level "L", by which FET 25 is in its OFF state. Upon the closing of the switch 33, the output of NAND gate 29 turns to the high level "H" which energizes FET 25 to turn ON, and a reference voltage "C" at the connection point between the resistors 26 and 27 is supplied to one terminal of capacitor 22 and to the gate of FET 23 through FET 25. Thus, the voltage difference "A-C" between voltage level "A", which indicates actual speed at this time, and the reference voltage "C" is applied to memory capacitor 22. Thus, the voltage difference "A-C" is memorized in capacitor 22. The gate voltage level of FET 23 is the reference level "C", which is supplied in an impedance conversion mode as the source voltage of FET 23 connected in collector follower mode. By opening the switch 33, the output of NAND gate 29 switches to the low level "L" by which FET 25 turns OFF. At the same time, voltage level "A" at the input terminal of capacitor 22 (connection point between resistor 21 and capacitor 22) calls down to voltage level "B" which will be determined by a potential divider circuit consisting of resistors 21 and 31. At this time, the gate voltage level of FET 23 falls down to "C-(A-B)". Since the gate voltage level and source voltage level of FET 23 are substantially equal, the constant voltage level of "C-(A-B)" is provided at the source of FET 23, assuming that the actual speed of the automobile is constant. Thereafter, if the automobile runs down a slope, and the actual speed increases, and the first signal level on capacitor 19 rises to "A+$\alpha$", then the voltage level of "C-(A-B)+$\alpha$" appears at the gate and source of FET 23, because the voltage across capacitor 22 remains "A-C". Thus, the source voltage of FET 23 rises by "$\alpha$" which corresponds to the increase of actual speed. Otherwise, if the automobile runs up a slope, and actual speed falls down to a lower speed, and the first signal level of capacitor 19 falls down to "A-$\alpha$", then the voltage level of "C-(A-B)-$\alpha$" appears at the gate and source of FET 23. Thus, the source voltage of FET 23 falls by "$\alpha$" which corresponds to decrease of actual speed. The memory and comparator circuit 20 thus memorizes a desired speed indication signal by closing the desired speed set switch 33 and provides a combined superposed signal consisting of the first and second electric signals, as well as the negative feedback signal from the source of FET 23.

The combined superposed signal is supplied to the minus input terminal of a voltage level comparator 41 of the comparator circuit 40. The plus input terminal of comparator 41 is connected to a connection point between resistors 44 and 45 through a resistor 43. The connection point in turn is connected to the switch 33 through a resistor 46 and diode 47. A capacitor 48 connected across input terminals of comparator 41 absorbs noise. A load resistor 49 is connected between constant voltage line 10 and the output terminal of comparator 41. The output of comparator 41 is at the high level "H" when the input voltage level of the minus terminal of comparator 41 is less than that of the plus terminal, and at the low level "L" when the former exceeds the latter. Switching transistor 67 in the power amplifier circuit 70 is biased to turn ON or OFF by output voltage level "H" or "L" of comparator 41 through a resistor 66. The input reference voltage level of the plus terminal of comparator 41 is adjusted by resistor 45.

The feedback circuit 50 includes an integration resistor 51 and capacitor 52, as well as a feedback resistor 53. The integrated signal on capacitor 52, i.e., the delayed output of comparator 41, is fed back to capacitor 22 through resistor 53. A connection point between resistor 51 and capacitor 52 is connected with switch 33 through a resistor 54 and a diode 55.

The voltage control circuit 60 includes a diode 58 for shunting reversed polarity voltage which might be applied on a power line 120, a capacitor 59 for noise absorption, a shunt transistor 61, a Zener diode 62, a capacitor 65 for ripple absorption and resistors 63 and 64. Upon the closing of main switch 57, the voltage of power source 56 is applied to load resistor 63. The Zener diode 62 breaks down when the voltage level of line 10 exceeds the breakdown voltage level of Zener diode 62, and then transistor 61 is deeply biased to conduct at a lower impedance, which increases the voltage drop across load resistor 63, and the voltage level of line 10 falls down to break down voltage of Zener diode 62. When the voltage level of line 10 is less than the breakdown voltage of Zener diode 62, the voltage across resistor 64 is lower so that transistor 61 is slightly biased to conduct at a higher impedance, which decreases the voltage drop across load resistor 63, and the voltage level of line 10 rises. Thus, the voltage level of line 10 is kept constant by the operation of Zener diode 62 and transistor 61.

The collector of switching transistor 67 of the power amplifier circuit 70 is connected with a modulator valve solenoid 72 which in turn is connected to power source 56 through main switch 57. The ON or OFF switching signal of high level "H" or low level "L" is applied to the base of transistor 67 from comparator 41 as described hereinbefore. The emitter of transistor 67 is connected to the collector of a transistor 71 through diode 69 and to the base of a transistor 73 through resistor 74, diode 76 and resistor 75.

The self-maintaining circuit 80 includes the transistors 71 and 73 which form a bistable multivibrator. The collector of transistor 71 is connected to the base of transistor 73 through diode 76 and resistors 74 and 75. The collector of transistor 73 is connected to the base of transistor 71 through a diode 79 and resistors 77 and 78. The output of comparator 41 through resistor 66 and diode 86, the integrated signal level of capacitor 52 (delayed output of comparator 41) through a diode 135, and the voltage level of line 10 through a resistor 85 are applied to the collector of transistor 73. The bases of transistors 71 and 73 are connected to ground with resistors 81 and 82, respectively. A capacitor 83 is connected between an intermediate point of resistors 77, 78 and ground. The collector of transistor 71 is connected with a release valve solenoid 84 which in turn is connected to power source 56 through main switch 57. The collector of transistor 73 is connected to a stop switch 91 through a diode 87 and also connected to a clutch switch 92 and a parking brake switch 93 through diodes 88 and 89, respectively.

The speed set control circuit 90 includes stop switch 91, clutch switch 92, parking brake switch 93 and a resume switch 106. A stop indication lamp 98 is serially connected with stop switch 91. The junction point between lamp 98 and stop switch 91 is connected to line 10 through a diode 97 and resistor 94, which in turn is connected to the base of transistor 73 through resistors 95, 101 and a diode 99 and also connected to ground through resistor 95 and a capacitor 96. The junction point between stop switch 91 and diode 87 is connected to ground through a resistor 103 and to power source 56 through a fuse 102. The junction point between resistor 75 and diode 76 is connected to resume switch 106 through a diode 104 and also to the desired speed set switch 33 through a diode 105. The resistors 82 and 101 are connected to the output terminal of a NAND gate 109 through a resistor 112 and a diode 111.

The speed set control prohibition circuit 110 includes the NAND gate 109, diode 111 and resistor 112.

The NAND gate 109 receives the actual speed indication signal from capacitor 19 of actual speed signal generator circuit 1 through a resistor 107 and the voltage of line 10 through a resistor 108. At an actual speed greater than a predetermined lower speed, the input of NAND gate 109 exceeds the threshold level of NAND gate 109, and the output of NAND gate 109 is low level "L". Whereas, if actual speed falls under the predetermined lower speed, the output of NAND gate 109 switches to high level "H", which energizes transistor 73 to turn ON. Thus the speed set control protection circuit 110 detects a decrease of the actual speed of the automobile under the predetermined lower value and energizes transistor 73 to turn ON. The reference predetermined lower speed value is adjusted by resistor 108.

The vacuum actuator 100 is employed as a transducer to convert the electrical signal for controlling the throttle valve position into a mechanical movement of a link member connected with the throttle valve of an engine on an automobile. The actuator 100 includes a flexible diaphragm 114 hermetically sealed to a housing 113 to form a pressure compartment 115 therein. A pressure plate 118 in pressure compartment 115 is connected with flexible diaphragm 114 by caulking a rivet 117. A compression spring 119, contained by pressure compartment 115, tends to expand compartment 115 by pushing plate 118 toward the left. A release valve 121 is normally biased by a compression spring 122 to connect pressure compartment 115 to outer atmospheric pressure. Upon energizating release valve solenoid 84, release valve 121 contacts a valve seat 123 in housing 113. A diode 124 connected across solenoid 84 shunts surges which might be applied to transistor 71 or solenoid 84. A modulator valve 125 in pressure compartment 115 is normally biased by a compression spring 128 to close a vacuum nozzle 126 connected with intake manifold 130 of the engine on the automobile and opens an atmospheric pressure nozzle 127. Upon energizing modulator valve solenoid 72, modulator valve 125 is forced against compression spring 128 to open vacuum nozzle 126 in pressure compartment 115 and close atmospheric pressure nozzle 127, by which flexible diaphragm 114 is forced to compress pressure compartment 115 with negative vacuum in compartment 115. An end of a chain 131 is connected with rivet 117 through its hole 116. The other end of chain 131 is connected with a lever 133 which drives throttle valve 132. A tension spring 134 normally forces lever 133 toward closure of throttle valve 132.

By closing main switch 57, base current flows to transistor 73 from power source 56 through main switch 57, releave valve solenoid 84, resistor 74, diode 76 and resistor 75. Thus, transistor 73 turns ON. However, transistor 71 does not turn ON in spite of application of the voltage of line 10 to the base of transistor 71 through resistors 85, 77, 78 and diode 79, because capacitor 83 delays application of base bias voltage to the base of transistor 71, and the turn ON of transistor 73 connects the base of transistor 71 to ground. During the ON state of transistor 73, the base of transistor 67 is connected to ground through diode 86 and transistor 73. Thus, transistor 67 remains in the OFF state even if the output of comparator 41 is high level "H". The base current through release valve solenoid 84 to transistor 73 is smaller than the energization current value or energization maintaining current value of release valve solenoid 84. Thus solenoids 72 and 84 are not energized. Therefore, release valve 121 and modulator valve 125 are at the position shown in FIG. 1, and pressure compartment 115 is at atmospheric pressure by which flexible diaphragm 114 is at the outermost position shown in FIG. 1. The actual speed of the automobile will be controlled by operating throttle valve 132 to any position through an accelerator pedal and linkage members (not shown).

By closing the desired speed set switch 33, the base of transistor 73 is connected to ground through resistor 75, diode 105 and switch 33. Thus transistor 73 turns OFF and transistor 71 turns ON, by which the base of transistor 73 is connected to ground through resistors 74, 75 and diode 76. Transistors 71 and 73 remain ON and OFF, respectively, after opening of switch 33. The emitter of transistor 67 is connected to ground through diode 69 and transistor 71. This transistor 71 may turn ON by the high level "H" of the output of comparator 41. Release valve solenoid 84 is energized by the turn ON of transistor 71. Thus release valve 121 closes valve seat 123. During closure of the desired speed set switch 33, integration capacitor 52 discharges to ground through resistor 54, diode 55 and switch 33. The output high level "H" of NAND gate 29 turns ON FET 25, which applies reference level "C" to the base of FET 23. However, the plus terminal of comparator 41 is connected to ground through resistor 46, diode 47 and switch 33. Therefore, voltage level "C" of the minus terminal of comparator 41 exceeds that of the plus terminal so that comparator 41 supplies a low level "L". Thus transistor 67 does not turn ON. Modulator valve solenoid 72 is not energized.

By opening the desired speed set switch 33, the output level of NAND gate 29 turns to low "L", by which FET 25 turns OFF. At this time voltage difference "A-C" is memorized in memory capacitor 22, and the source voltage level of "C-(A-B)" of FET 23 is supplied to the minus terminal of comparator 41. The voltage level of "C-(A-B)" corresponds to the actual speed of the automobile at the time when the desired speed set switch 33 is opened as described hereinbefore. The voltage across resistor 45 is higher than the mean level of the voltage "C-(A-B)" as described hereinbefore. Therefore comparator 41 supplies a high level "H". Since capacitor 19 integrates pulses from NAND gate 17, ripple appears at the source of FET 23 through resistor 21 and capacitor 22. Therefore, the output of comparator 41 pulsates between "H" and "L", which causes ON, OFF pulsation of transistor 67, which alternately energizes and deenergizes modulator valve solenoid 72. Therefore, modulator valve 125 repeatedly opens and closes nozzles 126 and 127. Thus vacuum is applied to pressure compartment 115. In the moment after opening of the desired speed set switch 33, the energized duration (time interval that valve 125 closes atmospheric pressure nozzle 127 and opens vacuum nozzle 126) of solenoid 72 is relatively long because the voltage across resistor 45 is higher than the mean level of the voltage "C-(A-B)", and also the feedback voltage level of integration capacitor 52 is low. Thus, the vacuum (negative pressure against atmosphere) increases rapidly in pressure compartment 115. As time goes on, the energized duration of modulator valve solenoid 72 decreases gradually, because the feedback voltage level of the integration capacitor 52 rises gradually, and the voltage level of the minus input terminal of comparator 41 rises gradually through capacitor 22 and FET 23. Therefore, the vacuum increase in pressure compartment 115 becomes lower and lower as time goes on. Finally, the energization duration of the modulator valve solenoid 72 becomes constant and holds the vacuum in compartment 115 at a constant value, whereby throttle valve 132 is held at the position at which the automobile runs at the desired speed memorized on capacitor 22. Thus throttle valve position control is achieved in a short time. Thereafter, if the actual speed of the automobile rises and the voltage level of capacitor 19 rises, the minus input voltage of comparator 41 rises in correspondence with the increase of actual speed. Thus, the duration of the high level "H" of the pulsating output of comparator 41, as well as energization duration of solenoid 72, decreases in synchronism with the discharge of capacitor 52. Therefore, the vacuum in compartment 115 decreases gradually to operate throttle valve 132 toward the closed position. During this operation, capacitor 52 continues to discharge and the actual speed of the automobile decreases gradually. Finally, the energization duration of solenoid 72 becomes shorter and constant to hold the vacuum in compartment 115 at a constant lower value, whereby throttle valve 132 is held at a position at which the automobile runs at the desired speed memorized on capacitor 22. In another case, if the actual speed of the automobile falls and the voltage level of capacitor 19 falls, the minus input voltage of comparator 41 falls in correspondence with the descrease of actual speed. Thus, the duration of the high level "H" of the pulsating output of comparator 41, as well as the energization duration of solenoid 72, become longer. Therefore, the vacuum in compartment 115 increases to operate throttle valve 132 toward full opened position. However, the feedback voltage of capacitor 52 rises by integration of the output "H" of longer duration. Therefore, the "H" duration of pulsating output of the comparator 41, as well as the energization duration of solenoid 72, decreases gradially from the longer one. Finally, the energization duration of solenoid 72 becomes longer and constant to hold the vacuum in compartment 115 at a constant higher value, whereby throttle valve 132 is held at a position at which the automobile runs at the desired speed memorized on capacitor 22. As described hereinbefore, the constant speed control of the automobile is processed automatically by the system shown in FIG. 1, after the acceleration or deceleration of the automobile to a desired speed and the closing of the desired speed set switch 33 at the correct moment.

Thereafter, alteration of the speed set in the system is readily possible by operating the desired speed set switch 33. As described hereinbefore, output pulses from NAND gate 17 are transmitted as ripple to the source of FET 23 and output of comparator 41 pulsates. The "H" level duration of the pulsating output of comparator 41 becomes longer and the "L" duration becomes shorter as the voltage level of capacitor 19 (actual speed) becomes lower; and the opening duration of vacuum nozzle 126 becomes longer, whereas the opening duration of atmospheric pressure nozzle 127 becomes shorter. Thus, the vacuum in pressure compartment 115 increases to a value at which the actual speed balances with desired speed set by the switch 33. Thus, the voltage on integration capacitor 52 is a constant one at the desired constant speed set by the switch 33. Upon closing the switch 33, capacitor 52 discharges through resistor 54, diode 55 and switch 33 to ground. However, the capacitance of capacitor 52 and the resistance of resistor 54 are so determined as to have a discharge time constant of about 1 to 2 sec. or so. Thus, the decrease of the voltage on capacitor 52 is relatively slow. Therefore, some voltage remains on capacitor 52 after closing of the switch 33 in a short time, and the voltage level of "A-C+D" is memorized on memory capacitor 22 at the time when the switch 33 opens. "A-C" corresponds to this actual speed when the switch 33 opens as described hereinbefore, and "D" is the remaining voltage on capacitor 52 at the opening time of the switch 33. Thus, higher speed is memorized on memory capacitor 22, and the system shown in FIG. 1 automatically operates to drive the automobile at higher constant speed and the voltage level of capacitor 52 becomes higher. The shorter the closure time of the switch 33, the higher the desired speed memorized on the memory capacitor 22. On the other hand, the voltage level of the plus terminal of comparator 41 falls to a lower level during closure of the switch 33 through resistor 46, diode 47 and switch 33. Therefore, the duration of level "H" of the pulsating output of comparator 41 becomes shorter, so that the vacuum in pressure compartment 115 decreases gradually during closure of the switch 33, and throttle valve 132 moves toward its closed position to decelerate actual speed. Thus the longer the closure of the switch 33, the lower the actual speed and voltage on the capacitor 52, whereby the memorized desired speed on the memory capacitor 22 at the opening of the switch 33 is a lower one as compared with the preceeding memorized one. Therefore, the speed level to be memorized on the capacitor 22 is readily adjusted by closure time duration of the desired speed set switch 33. Repetition of shorter time closures of the switch 33 raises the speed memorized on the memory capacitor 22 rapidly.

The constant speed control operation is cancelled by momentary closure of stop lamp switch 91, clutch switch 92 or parking brake switch 93. Assuming that the stop lamp switch 91 is closed, transistor 73 is biased to turn ON by the voltage level of line 10 through resistor 94, 95, diode 99 and resistor 101 (the serial connection of resistor 95, diode 99 and resistor 101 is shunted to ground through diode 97 and stop lamp 98 in the closed state of the switch 91). Thus, transistor 71 turns OFF. Therefore, release valve solenoid 84 is deenergized, and release valve 121 moves from valve seat 123. Then the inner pressure of pressure compartment 115 rises to atmospheric pressure rapidly, which drives flexible diaphragm 114 toward the left position shown in FIG. 1. Throttle valve 132 closes rapidly. At the same time, the base of transistor 67 is connected to ground through diode 86 and transistor 73. The transistor 67 turns OFF and modulator valve solenoid 72 is deenergized. The capacitor 52 discharges through diodes 135, 87, the switch 91 and lamp 98. The capacitor 96 absorbs surges which may arise on the electrical wiring of stop lamp 98.

Assuming that the clutch switch 92 or parking brake switch 93 is closed momentarily, transistors 71 and 73 turn OFF and ON, respectively, because base current to transistor 71 through resistors 77, 78 and diode 79 is shunted to ground through diode 88 and switch 92, or diode 89 and switch 93.

To drive the automobile with automatic constant speed control after brake operation or clutch operation, i.e., after momentary closure operation of the switch 91, 92 or 93, the driver momentarily closes resume switch 106. By closing the resume switch 106, base current to the transistor through resistor 75 is shunted by diode 104 and switch 106. Thus, transistor 73 turns OFF and transistor 71 turns ON. Therefore, release valve solenoid 84 is energized and modulator valve solenoid 72 is energized in correspondence with the pulsating output of comparator 41. Thereafter, the system operates in a constant speed control mode.

If actual speed falls below a predetermined speed, and the input voltage level of NAND gate 109 falls below the threshold level of NAND gate 109, the output thereof switches to high level "H". This high level output of NAND gate 109 is applied to the base of transistor 73 through diodes 111 and 112. Then transistor 73 turns ON and transistor 71 turns OFF. Thus constant speed control operation is cancelled. This cancellation prevents abrupt acceleration of the automobile, which might occur without the speed set control prohibition circuit 110 if the speed signal from the actual speed signal generator circuit 1 should accidentally rapidly fall or disappear.

The fuse 102 of lamp circuit 98 may open-circuit, in which case the base current of transistor 71 is shunted through diode 87 and resistor 103. Thus, transistor 71 turns OFF and the constant speed control operation is cancelled.

The vacuum applied to nozzle 126 from intake manifold 130 does not fluctuate substantially. And even if the vacuum in the intake manifold 130 varies, it does not cause erroneous control of the speed, because the vacuum in the pressure compartment 115 is controlled so as to maintain the constant speed memorized on memory capacitor 22.

The feedback circuit 50 accumulates or integrates output pulses from comparator 41 and supplies the input terminal of memory capacitor 22 with the integrated voltage level of capacitor 52 as a negative feedback signal as described hereinbefore. The integrated voltage of capacitor 52 is constant during the time when the automobile runs at the desired speed memorized on memory capacitor 22. When the actual speed falls from the desired speed, the duration of the high level "H" of the pulsating output of comparator 41 becomes longer, and the inner vacuum of pressure compartment 115 increases gradually to increase actual speed. However, an increase of actual speed delays an increase of the inner vacuum of compartment 115. The integrated voltage level of capacitor 52 gradually rises during increase of the inner vacuum, which raises the voltage of the input terminal of memory capacitor 22 gradually, and the actual speed rises gradually. Then, the high level "H" duration of the pulsating output of comparator 41 becomes shorter gradually, and the vacuum increase in pressure compartment 115, as well as the charging rate of capacitor 52, are decelerated gradually. Finally, at the desired speed, rise of the voltage on capacitor 52 and of the inner vacuum of pressure compartment 115 come to a stop. In this manner, integration capacitor 52 provides the input terminal of memory capacitor 22 with a negative feedback signal to limit duration of the acceleration signal fed to actuator 100 and moves throttle valve 132 smoothly in a stabilized mode to a new position at which the automobile runs at the desired speed. When the actual speed rises from the desired speed, the duration of high level "H" of the pulsating output of comparator 41 becomes shorter, and the inner vacuum of pressure compartment 115 decreases gradually to decrease actual speed. However, decrease of actual speed delays the decrease of the inner vacuum of compartment 115. The integrated voltage level of capacitor 52 gradually falls during decrease of the inner vacuum, by which the voltage of the input terminal of memory capacitor 22 falls gradually, and actual speed falls gradually. Then, the high level "H" duration of the pulsating output of comparator 41 becomes longer gradually, and the vacuum decrease in pressure compartment 115, as well as the discharging rate of capacitor 52, are decelerated gradually. Finally at the desired speed, the decreasing of the voltage on capacitor 52 and of the inner vacuum pressure compartment 115 come to a stop. In this manner, integration capacitor 52 provides the input terminal of memory capacitor 22 with a negative feedback signal to limit the duration of the deceleration signal to actuator 100 and moves throttle valve 132 smoothly in a stabilized mode to a new position at which the automobile runs at the desired speed. The system thus controls the throttle valve 132 in phase-leading mode with the feedback circuit 50. Without the negative feedback signal of the feedback circuit 50, overacceleration or -deceleration may occur due to delay of actual speed controlled by throttle valve 132 and actuator 100, and thus hunting of actual speed may occur.

The comparator circuit 40 in the system shown in FIG. 1 is employed for controlling the inner vacuum of compartment 115 with modulator valve solenoid 72 in duty-cycle operation mode. The output positive pulse duration of comparator 41 corresponds to an error signal level which indicates the difference between actual speed and the desired speed memorized on capacitor 22.

Figure 2:
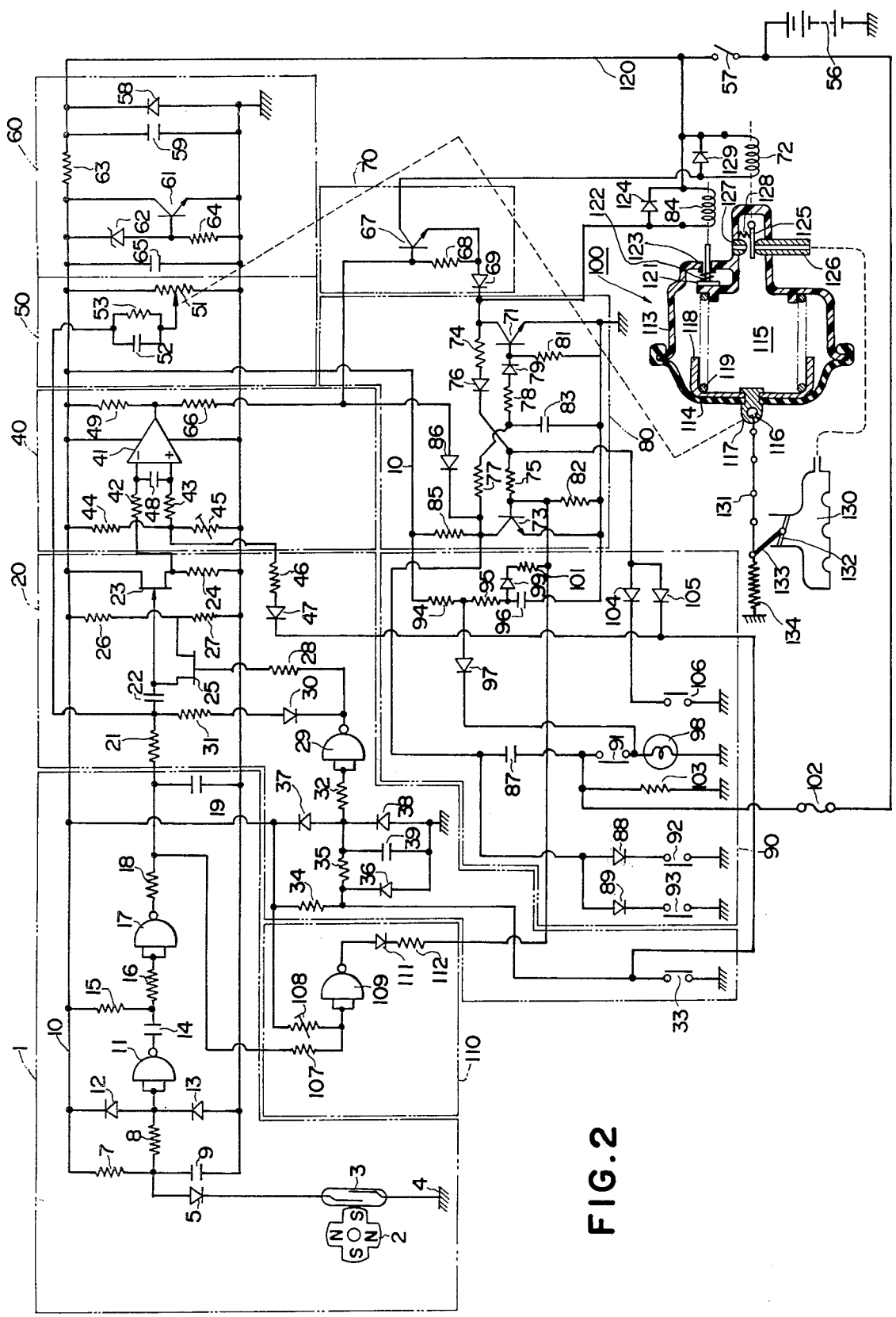
FIG. 2 is a schematic circuit diagram illustrating another embodiment of the present invention.

In the system shown in FIG. 2 the feedback circuit 50 is formed by a variable resistor 51 and the parallel-connected capacitor 52 and resistor 53. The slider of resistor 51 is connected mechanically to flexible diaphragm 114 as shown by the dotted line in FIG. 2 so that the voltage level on the slider rises in correspondence with a decrease of vacuum in pressure compartment 115. The voltage level of the slider is applied to memory capacitor 22 through capacitor 52 and resistor 53. In the constant speed control mode of the system shown in FIG. 2, if actual speed rises over the desired speed memorized on capacitor 22, throttle valve 132 moves toward its closed position by the operation of comparator 41 and solenoid 72. However, this movement of throttle valve 132 lowers the voltage level on the slider of resistor 51. Thus, the voltage level at the input terminal of capacitor 22 decreases as if actual speed is increasing, before the actual speed really increases in response to throttle valve position. Then movement of throttle valve 132 is decelerated gradually by the operation of comparator 41 and solenoid 72. Finally throttle valve 132 stops at a position at which the automobile runs at the desired speed memorized on capacitor 22. Thus, throttle valve control for maintaining actual speed constant is stabilized by the negative feedback of the throttle valve position and no hunting occurs. By momentarily closing the set switch 33, memory capacitor 22 memorizes "A-C+$\beta$" wherein $\beta$ is the voltage level of the slider of resistor 51. Therefore, throttle valve 132 opens to a position at which the automobile runs at a higher constant speed which corresponds to "A-C+$\beta$". Therefore, the voltage level of the slider of resistor 51 rises further. Then by momentarily closing the set switch 33 again, memory capacitor 22 memorizes a higher voltage level. Thus, the desired speed signal level memorized on capacitor 22 rises step by step upon repetitious momentary closures of the set switch 33. On the other hand, the resistor 45 is shunted by resistor 46, diode 47 and switch 33 during closure of set switch 33, thus shortening the high level "H" duration of the output of comparator 41, and the vacuum pressure in compartment 115 gradually falls. Therefore, the longer the closure of set switch 33, the lower the voltage level at the input terminal of capacitor 22. Thus, by closing set switch 33 for a relatively long time, the desired speed signal level to be memorized on capacitor 22 becomes low. Therefore, the desired speed level is adjusted by closure time of the set switch 33.

As will be understood from the foregoing description, constant speed control operation is stabilized with the negative feedback signal from the circuit 50. The desired automobile speed which has been set is altered automatically by the switching duration of the set switch 33.

Obviously many modifications and variations of the present invention are possible in the light of the above teachings; for example, the actuator 100 may be replaced by an electrical motor unit for digital position control. It is therefore to be understood that, within the scope of the appended claims, the invention may be practiced otherwise than as specifically disclosed.

We claim:

1. Automobile speed control system for maintaining the actual automobile speed at a desired automobile speed and having a throttle valve and comprising:
    an actual speed generator circuit which generates a first electrical signal indicating actual automobile speed;
    circuit means providing a negative feedback signal substantially corresponding to the position of the throttle valve;
    memory circuit means including at least a set switch operable to OPEN and CLOSED positions, a memory member to which a superposed signal consisting of the first electrical signal and the negative feedback signal is applied, and a memorization control circuit which energizes the memory member to memorize the superposed signal, as the desired automobile speed, in correspondence with the operation of the set switch;
    comparator circuit means for combining said first electrical signal, the memorized superposed signal of the memory circuit means and the negative feedback signal to provide an error signal;
    converter means to convert the error signal to mechanical movement of the throttle valve;
    a self-maintaining circuit which is set by the operation of the set switch to enable throttle valve position control operation of the converter means with the error signal; and
    a speed set control circuit means including at least a switch for cancelling the setting of the self-maintaining circuit.

2. Automobile speed control system as claimed in claim 1, and including an engine having an intake manifold, and wherein: the actual speed generator circuit generates a first electrical analog signal having a ripple thereon and indicating actual automobile speed; the comparator circuit means includes a combining circuit means which combines the first electrical analog signal, the memorized superposed signal and the negative feedback signal, and a comparator which compares the combined output signal of said combining circuit means with a reference signal and generates a binary pulsating signal; and the converter means is a vacuum actuator including at least a pressure compartment formed in a housing member and a flexible diaphragm, a compression spring which drives the flexible diaphragm to expand the pressure compartment, a vacuum nozzle for connecting the pressure compartment to intake manifold, an atmospheric pressure nozzle for connecting the compartment to the atmosphere, a modulator valve movable between a first position, at which it closes the vacuum nozzle and opens the atmospheric pressure nozzle, and a second position at which it opens the vacuum nozzle and closes the atmospheric pressure nozzle, and a solenoid which is energized with said binary pulsating signal from said comparator to drive the modulator valve.

3. Automobile speed control system as claimed in claim 1 wherein the circuit means providing a negative feedback signal is an integrating circuit which integrates the error signal.

4. Automobile speed control system as claimed in claim 1, wherein said converter means comprises electro-mechanical actuator means positionable to impart the mechanical movement to the throttle valve, and wherein the circuit means providing a negative feedback signal includes a position sensing means for generating the negative feedback signal in response to the position of said actuator means.

* * * * *